US00RE40529E

(19) United States
(12) Reissued Patent
Shirato et al.

(10) Patent Number: US RE40,529 E
(45) Date of Reissued Patent: Oct. 7, 2008

(54) INK JET RECORDING APPARATUS AND METHOD USING INK JET HEAD HAVING U-SHAPED WIRING

(75) Inventors: Yoshiaki Shirato, Tokyo (JP); Yasushi Takatori, Sagamihara (JP); Toshitami Hara, Tokyo (JP); Yukuo Nishimura, Urawa (JP); Michiko Tanaka, Yokohama (JP)

(73) Assignee: Canon Kabushiki Kaisha, Tokyo (JP)

(21) Appl. No.: 09/921,333
(22) Filed: Aug. 3, 2001

Related U.S. Patent Documents

Reissue of:
(64) Patent No.: 5,933,165
Issued: Aug. 3, 1999
Appl. No.: 08/407,397
Filed: Mar. 17, 1995

U.S. Applications:
(63) Continuation of application No. 08/159,709, filed on Dec. 1, 1993, now abandoned, which is a continuation of application No. 07/998,053, filed on Dec. 29, 1992, now abandoned, which is a division of application No. 07/711,418, filed on Jun. 5, 1991, now Pat. No. 5,204,689, which is a continuation of application No. 07/632,610, filed on Dec. 27, 1990, now abandoned, which is a continuation of application No. 07/403,860, filed on Sep. 1, 1989, now abandoned, which is a continuation of application No. 07/188,071, filed on Apr. 28, 1988, now abandoned, which is a continuation of application No. 07/013,172, filed on Feb. 9, 1987, now abandoned, which is a continuation of application No. 06/846,472, filed on Mar. 31, 1986, now abandoned, which is a continuation of application No. 06/750,985, filed on Jul. 1, 1985, now abandoned, which is a continuation of application No. 06/639,531, filed on Aug. 9, 1984, now abandoned, which is a continuation of application No. 06/543,224, filed on Oct. 20, 1983, now abandoned, which is a continuation of application No. 06/362,579, filed on Mar. 29, 1982, now abandoned, which is a continuation of application No. 06/132,774, filed on Mar. 24, 1980, now abandoned.

(30) Foreign Application Priority Data

Apr. 2, 1979 (JP) ..... 54-39478

(51) Int. Cl.
*B41J 2/05* (2006.01)

(52) U.S. Cl. ..... 347/56; 347/58
(58) Field of Classification Search ..... 347/57–59, 347/20, 56, 61, 63–65, 67, 62, 208–211
See application file for complete search history.

(56) References Cited

U.S. PATENT DOCUMENTS 3,177,800 A * 4/1965 Welsh
3,267,485 A * 8/1966 Howell ..... 346/139 C (Continued)

FOREIGN PATENT DOCUMENTS

DE 2115530 * 10/1971
DE 2532037 * 1/1976
DE 2843064 * 4/1979

OTHER PUBLICATIONS

IEEE Transactions on Industry Applications vol. IA–13, No. 1, Jan./Feb. 1977.*

*Primary Examiner*—Juanita D Stephens
(74) *Attorney, Agent, or Firm*—Fitzpatrick, Cella, Harper & Scinto

(57) ABSTRACT

An ink jet recording method includes the steps of providing an ink jet recording head having a plurality of discharge openings for discharging ink, a plurality of liquid passageways for holding ink and a plurality of heat generating members. Each of the heat generating members corresponds to a liquid passageway and each heat generating member has a pair of electrodes for driving the heat generating member individually and the electrodes and corresponding heat generating member form a U-shaped wiring portion. The recording head may be manufactured using a cutting process. A voltage is applied to selected pairs of electrodes for driving selected heat generating members individually for providing thermal energy to the ink in the liquid passageway for abruptly forming a bubble and discharging ink from the discharge opening and recording on a recording medium.

25 Claims, 5 Drawing Sheets

U.S. PATENT DOCUMENTS 3,296,574 A * 1/1967 Tassara ..... 338/309
3,393,988 A * 7/1968 Blumenthal ..... 65/61
3,683,212 A * 8/1972 Zoltan
3,747,120 A * 7/1973 Stemme
3,878,519 A * 4/1975 Eaton
3,940,773 A * 2/1976 Mizoguchi
3,965,330 A * 6/1976 Williams
3,967,092 A * 6/1976 Conta et al.
4,104,646 A * 8/1978 Fischbeck
4,131,899 A * 12/1978 Christou
4,243,994 A * 1/1981 Kobayashi et al.
4,251,824 A * 2/1981 Hara et al.
4,296,421 A * 10/1981 Hara et al.
4,313,684 A * 2/1982 Tazaki et al.
4,317,124 A * 2/1982 Shirato et al.
4,330,787 A * 5/1982 Sato et al.
4,334,234 A * 6/1982 Shirato et al.
4,335,389 A * 6/1982 Shirato et al.
4,336,548 A * 6/1982 Matsumoto
4,337,467 A * 6/1982 Yano
4,338,611 A * 7/1982 Eida
4,339,762 A * 7/1982 Shirato et al.
4,343,968 A * 8/1982 Toyomura
4,345,262 A * 8/1982 Shirato et al.
4,353,079 A * 10/1982 Kawanabe
4,392,907 A * 7/1983 Shirato et al.
4,458,256 A * 7/1984 Shirato et al.
4,463,359 A * 7/1984 Ayata et al.
4,631,555 A * 12/1986 Ikeda ..... 347/58
4,723,129 A * 2/1988 Endo et al. ..... 347/56

* cited by examiner

INK JET RECORDING APPARATUS AND METHOD USING INK JET HEAD HAVING U-SHAPED WIRING

Matter enclosed in heavy brackets [ ] appears in the original patent but forms no part of this reissue specification; matter printed in italics indicates the additions made by reissue.

This application is a continuation of application Ser. No. 08/159,709 filed Dec. 1, 1993, now abandoned, which in turn is a continuation of application Ser. No. 07/998,053 filed Dec. 29, 1992, now abandoned, which is a division of application Ser. No. 07/711,418 filed Jun. 5, 1991, now U.S. Pat. No. 5,204,689, which is a continuation of application Ser. No. 07/632,610, filed Dec. 27, 1990, now abandoned, which is a continuation of application Ser. No. 07/403,860, filed Sep. 1, 1989, now abandoned, which is a continuation of application Ser. No. 07/188,071, filed Apr. 28, 1988, now abandoned, which is a continuation of application Ser. No. 07/013,172 filed Feb. 9, 1987, now abandoned, which is a continuation of application Ser. No. 06/846,472 filed Mar. 31, 1986, now abandoned, which is a continuation of application Ser. No. 06/750,985 filed Jul. 1, 1985, now abandoned, which is a continuation of application Ser. No. 06/639,531 filed Aug. 9, 1984, now abandoned, which is a continuation of application Ser. No. 06/543,224 filed Oct. 20, 1983, now abandoned, which is a continuation of application Ser. No. 06/362,579 filed Mar. 29, 1982, now abandoned, which is a continuation of application Ser. No. 06/132,774 filed Mar. 24, 1980, which is now abandoned.

BACKGROUND OF THE INVENTION

1. Field of the Invention

This invention relates to a droplet forming apparatus which causes injection liquid generally called ink to discharge and fly as droplets through an orifice by imparting a thermal action to the liquid.

2. Description of the Prior Art

Among the various known recording systems, the so-called ink jet recording method which is a non-impact recording system substantially free of noise during the recording and which enables recording to be effected on plain paper at high speed without requiring the fixation treatment is accepted as a very useful recording system. About this ink jet recording method, various systems have heretofore been proposed and improvements have been made and some ink jet recording systems have already become commercially available while, on the other hand, some ink jet recording systems are undergoing the efforts to put them into practice.

The ink jet recording method effects recording by causing small droplets of recording liquid called ink to fly on various action principles and causing them to adhere to a recording member such as paper or the like.

In this ink jet recording method, use is usually made of an apparatus provided with a recording head having a discharge orifice through which ink may discharge and fly as small droplets and an inflow opening through which the ink may flow in. There are various types of such apparatus depending on the differences in the system for forming small droplets of ink.

For example, one of these types is such that ink is supplied under pressure or under natural supply condition (such as the supply condition utilizing the capillary phenomenon) from an ink supply tank into a predetermined chamber and a voltage is applied between the ink in the chamber and an electrode installed forwardly of the discharge orifice to cause the ink to electrostatically discharge through the discharge orifice.

In another type of ink jet apparatus, ink is caused to discharge and fly as ink droplets by mechanical vibration. That is, this type of apparatus is such that the volume of the chamber into which the ink is supplied is varied by mechanical vibration of a piezo vibratory element in accordance with a signal, whereby the ink is caused to discharge as small droplets. The specific construction thereof is disclosed in U.S. Pat. No. 3,747,120, IEEE Transactions on Industry Applications Vol. IA-13, No. 1, January/February 1977, etc.

A specific example of the droplet forming apparatus for application to the above-described ink jet recording method is already disclosed in U.S. Pat. No. 3,878,519. The droplet forming apparatus disclosed therein may be summarized as follows:

An apparatus for forming droplets at a substantially constant breakoff point and with substantially uniform distances from each other from a liquid stream including:

means to supply the liquid stream through an opening or the like; and means to selectively alter the surface tension of spaced segments of the stream to form droplets at substantially uniform distances from each other and of substantially uniform size, said selectively altering means being applied to each of the spaced segments of the stream as it passes a predetermined portion of its path to initially reduce the surface tension of each of the spaced segments before random break up of the stream into droplets would occur after the stream exits from the opening.

As the "means to selectively alter the surface tension of spaced segments of the stream to form droplets at substantially uniform distances from each other and of substantially uniform size" in such an apparatus, there are specifically a "high intensity light source" and "heating means" proximate to the discharge opening.

This apparatus for forming droplets is not of the type which uses all of the ink supply including the liquid pressurizing means for causing the liquid stream to discharge, the deflection means for droplets and the formed droplets and therefore, requires a gutter for collecting unnecessary ones of the droplets and thus, it is difficult to make the entire apparatus compact. Also, in this apparatus, the degree of the force forming the droplets is originally weak and therefore, there is only obtained insufficient uniformity of the droplet diameter. Further, in the same apparatus, unless strict adjustment of the liquid pressurizing force is effected in the ink supply, it is not possible to provide uniformity of the diameters of the droplets, constant discharge speed thereof and uniformity of the discharge direction thereof.

SUMMARY OF THE INVENTION

It is an object of the present invention to solve the technical subject in this type of technical field which could not be solved by the prior art.

In view of this point, it is another object of the present invention to provide an apparatus which is excellent in uniformity of ink droplets discharged, discharge responsiveness or discharge stability and long-tine continuous discharge stability.

It is still another object of the present invention to provide a compact apparatus which is capable of high-speed recording.

It is yet another object of the present invention to provide a novel droplet forming apparatus which is easy to manufacture and which can be made into a practical and highly dense multi-orifice type.

According to the present invention, there is provided a droplet forming apparatus in which at a portion of a fine bore providing a passageway of liquid, means for generating a bubble in the liquid introduced into said fine bore is disposed and generation and disappearance of said bubble is effected to thereby cause said liquid to discharge through an opening communicated with said fine bore, characterized in that the bubble generated in said liquid produces a sufficient pressure action to cause droplets of substantially uniform diameter to discharge and said means is disposed at such a position that said bubble is not communicated with the atmosphere.

The invention will become more fully apparent from the following detailed description thereof taken in conjunction with the accompanying drawings.

BRIEF DESCRIPTION OF THE DRAWINGS

FIGS. 9A and 9B to FIG. 12 illustrate an embodiment of the present invention.

DESCRIPTION OF THE PREFERRED EMBODIMENTS

In the thus constructed droplet forming apparatus of the present invention, signal energy is effectively used to cause ink to discharge and fly as droplets, thus greatly improving the discharge efficiency of ink droplets, discharge responsiveness and long-time continuous recording capability. Above all, in the apparatus of the present invention, the size and discharge direction of ink droplets discharged through the discharge orifice are not at all disturbed and the apparatus is excellent in uniformity of discharged ink droplets and discharge stability.

Also, the apparatus of the present invention is simple in construction and the minute machining thereof can be easily accomplished so that the droplet forming head portion itself can be made much more compact as compared to the conventional apparatus, and the simplicity of the construction thereof and the ease of the machining thereof lead to great ease with which a highly dense multi-orifice array indispensable for high-speed recording can be realized. Further, the apparatus of the present invention has remarkable features that removal of a signal entering electrode can be accomplished very easily, that in the realization of the multi-orifice array, the array construction of the discharge orifice in the droplet forming head portion can be arbitrarily designed as desired and that such head portion can be very easily made into a bar-like construction.

Figure 1:
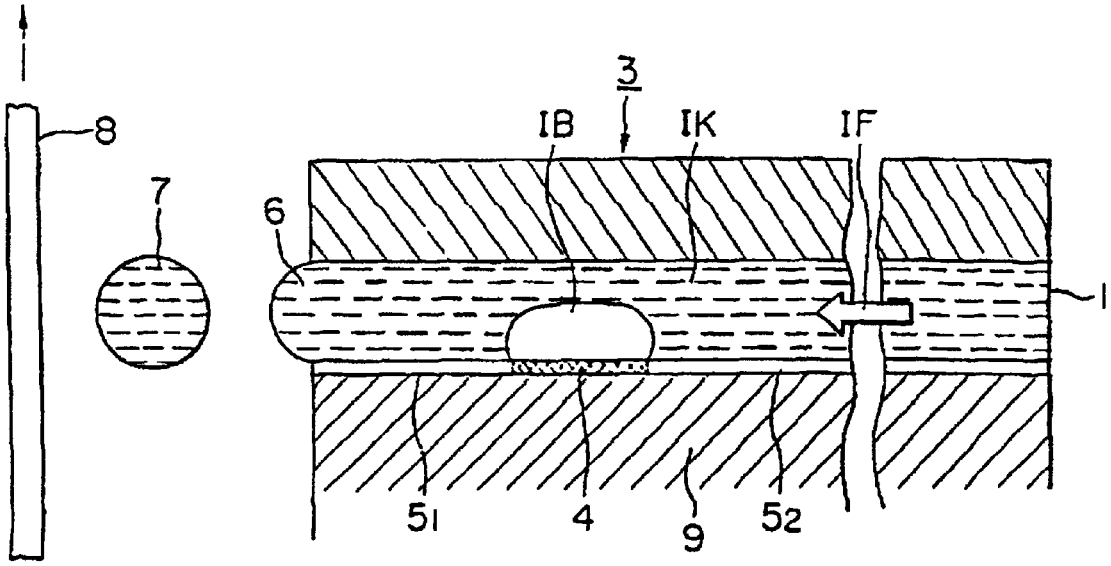
FIG. 1 is a schematic cross-sectional view of a droplet forming apparatus illustrating the recording principle of the present invention.

The invention will hereinafter be described with respect to an embodiment thereof shown in the drawings. Reference is first made to FIG. 1 to generally describe the ink jet recording system by the droplet forming apparatus of the present invention. For convenience of description, this shown embodiment will be described by taking a single orifice type droplet forming apparatus as an example, although it is not intended that the present invention be restricted thereto. That is, the present invention can also realize a multi-array orifice type apparatus easily.

In FIG. 1, ink IK introduced in the direction of arrow IF from an ink supply portion, not shown, through an introduction port 1 flows into an action chamber 2 comprising an elongated bore formed in a recording head portion 3 to fill the chamber. A heat generating member 4 attached to a portion of the action chamber 2 is in contact with the ink IK which has flowed into the action chamber 2 and, when this heat generating member 4 is electrically energized to generate heat and heat the ink IK above its gasification temperature, a bubble IB is momentarily formed in the ink IK.

The heat generating member 4 generates a sufficient thermal pulse to gasify the ink IK by being electrically energized through electrodes $\mathbf{5}_1$ and $\mathbf{5}_2$ connected to the heat generating member, and this heat is applied to the ink IK. This heat action causes the state change of the ink IK such as gasification, as a result of which the bubble IB is formed to increase the internal pressure of the action chamber 2. In response to such increase in the internal pressure, the ink IK is discharged through an orifice 6 and this becomes a droplet 7 which flies and adheres to a recording member 8 such as paper or the like, thus accomplishing the recording.

The heat generating member 4 is provided on a base plate 9 and in contact with a portion of the action chamber 2 and, when a voltage is applied thereto through the electrodes $\mathbf{5}_1$ and $\mathbf{5}_2$ in accordance with the input of a recording signal, the heat generating member generates pulse-like heat. Thus, in the shown embodiment, recording by an ink droplet corresponding to the input signal is accomplished by the ink droplet 7 which is projected and adhered to the recording member 8.

In the above-described ink jet recording system, the quality of the discharge state of the ink droplet is greatly affected depending on the effective heat generating area of the heat generating member 4 and the position whereat this heat generating member 4 is installed relative to the action chamber 2 and therefore, sufficient attention must be paid to the setting thereof. According to the findings which the inventors have obtained by making and studying various forms of droplet forming apparatus based on FIG. 1 and different constructions and arrangements, the position whereat the heat generating member 4 is installed in the action chamber 2, particularly, the relative positional relation of the heat generating member to the discharge orifice 6, is a very important factor which governs the quality of the discharge state of the ink droplet.

That is, where the heat generating member 4 is too close to the discharge orifice 6, the bubble IB created in the ink IK is communicated with the atmosphere through the orifice 6 and therefore, the ink IK discharged through the orifice 6 does not form a droplet of a predetermined size but is divided into fog-like fine droplets of irregular diameters, and these fine droplets tend to splash. Also, in an extreme case where the heat generating member 4 extends even to the discharge orifice 6, no ink droplet is discharged even if the bubble IB is created.

To avoid such inconveniences, it is desirable that the location of the heat generating member 4 be spaced apart from the discharge orifice in a predetermined range and, if the spacing between the heat generating member 4 and the discharge orifice 6 departs from said predetermined range, the diameters of discharged ink droplets become irregular while, at the same time, the initial speed of the discharged ink droplets is reduced until, at last, a sufficient pressure action to cause discharge of ink droplets is not imparted to the ink IK in the action chamber 2 and therefore, the spacing between the heat generating member and the discharge orifice is limited. According to the studies carried out by the inventors regarding these conditions, it has been found that when the diameter of the discharge orifice is represented by "d" (the discharge orifice can assume any arbitrary shape such as circular shape, square shape or the like and therefore, generally, the maximum diameter thereof is regarded the diameter thereof), it is advisable to set the heat generating member 4 in the action chamber 2 so that the edge of the heat generating member which is adjacent to the discharge orifice 6 is spaced apart from the discharge orifice 6 in the range of about d to about 50 d. Further, it has been found that when importance is attached to the discharge speed of the ink droplet, it is preferable to set the heat generating member 4 in the range of about 10d to about 30d and that when importance is attached to the uniformity of discharged ink droplets and the long-time continuous discharge stability, it is desirable to set the heat generating member 4 in the range of about d to about 10d. That is, when the droplet forming apparatus is constructed while satisfying the above-described conditions, the uniformity of the size of the ink droplets, the stability of the discharge direction thereof, the discharge speed thereof or the stability thereof with lapse of time can be maintained at a practicable level.

Incidentally, the embodiment of FIG. 1 previously described in detail is shown with respect only to a mode in which the recording is effected with the recording member 8 being moved in the direction of arrow, whereas the recording mode using the apparatus of the present invention is not limited to such mode. That is, the recording member 8 should only be moved relative to the orifice 6 and therefore, various changes may be made so that the recording member 8 is moved in the direction opposite to the direction of arrow, that the recording member 8 is moved back and forth with the plane of the drawing sheet as the standard or that the orifice 6 is moved in any desired direction with the recording member 8 being fixed.

Further, it is arbitrary and very easy to apply the present invention to a multi-orifice array recording apparatus.

On the other hand, in the droplet forming apparatus of the present invention, it is desirable for the purpose of efficiently transmitting to the ink IK the heat generated by the heat generating member 4 that this heat generating member 4 be installed on the inner wall of the action chamber 2, but it is not easy to secure the effective area thereof (the area capable of generating the quantity of the heat necessary to cause the ink to be discharged) in the action chamber 2 which comprises a fine bore generally having a cross-sectional area of the order of 30–250 μmϕ.

Nevertheless, in the present invention, the heat generating member 4 is elongated in the axial direction of the action chamber 2 so as to secure the effective area in the fine action chamber 2.

Figure 2:
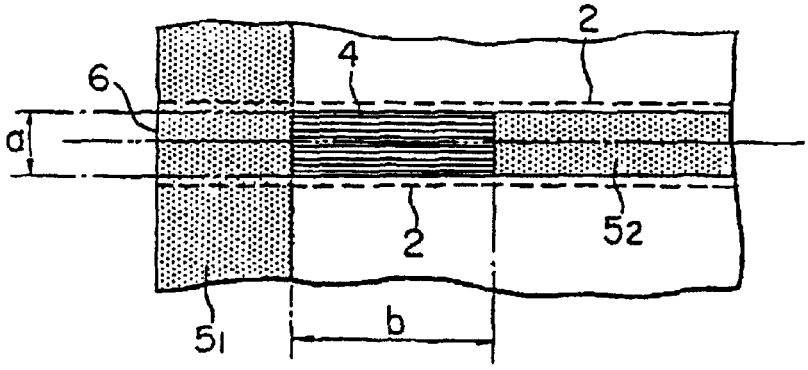
FIGS. 2 to 8 are schematic plane views for illustrating the examples of the configuration of a heat generating member used in the present invention.
Figure 3:
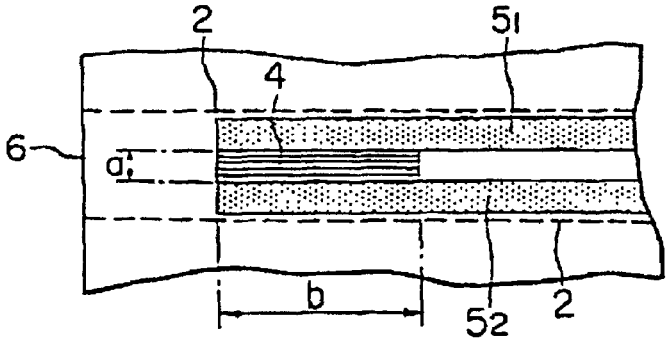

This will further be described with respect to a specific example. The heat generating member 4 suitable for the present invention, as shown in the schematic plane view of FIG. 2, is a planar heat generating resistor installed within the area of the action chamber 2 indicated by dot-and-dash lines and having a shorter side a (length $l_1$) orthogonal to the axis (dots-and-dash line) of the action chamber 2 and a longer side b having a length of $2\times l_1$ or more in the axial direction of the action chamber 2.

Figure 4:
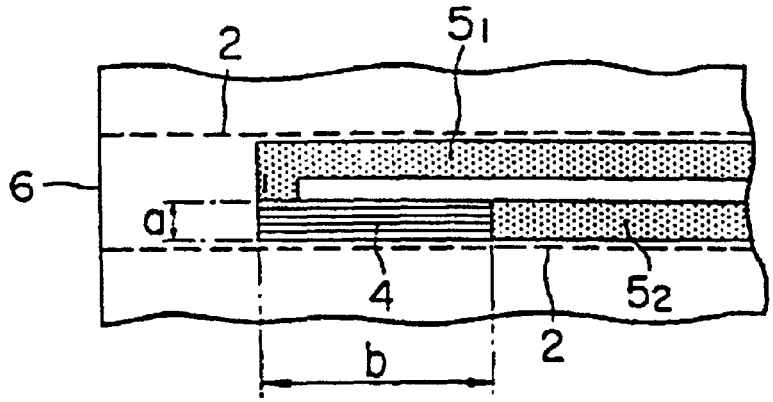
Figure 5:
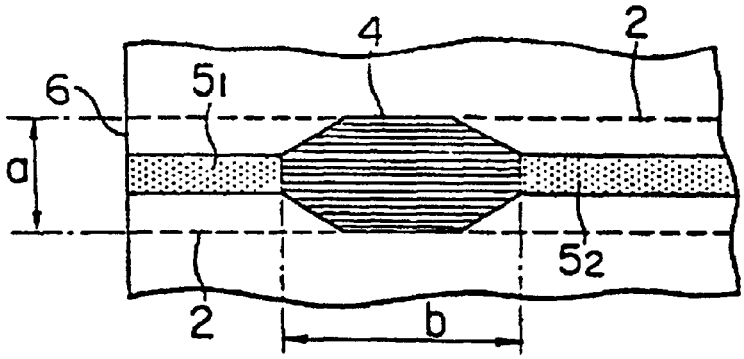
Figure 6:
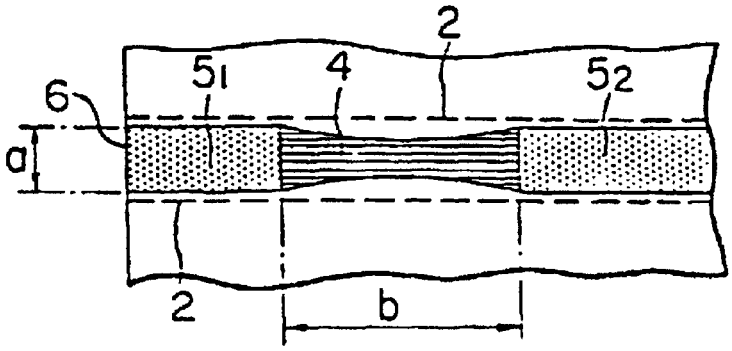
Figure 7:
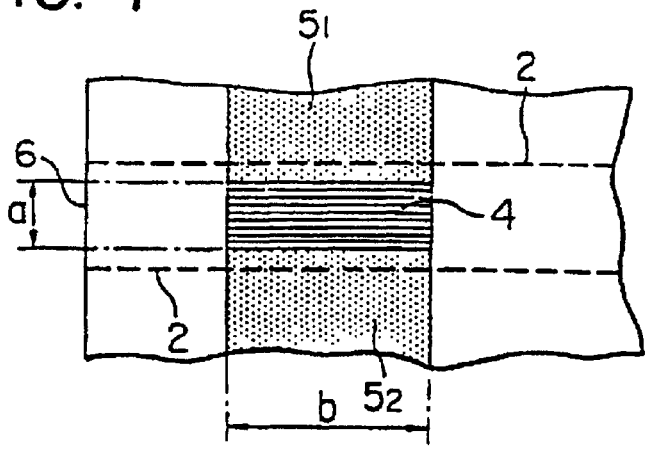
Figure 8:
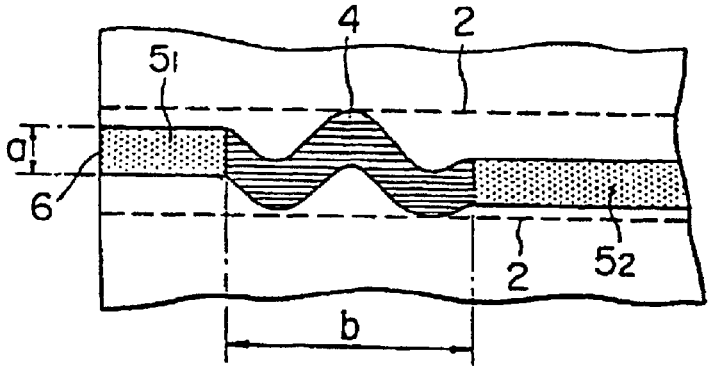

Now, according to the ink jet recording system of the present invention, the planar shape of the heat generating member 4 is never reproduced into a record shape (a dot shape by ink droplet) and can therefore be determined with a considerable degree of freedom unlike the case of the so-called conventional thermal head which in contact with thermal paper to effect recording. Accordingly, the present invention can also adopt various forms of heat generating member 4 as shown, for example, in FIGS. 3 to 8 which are schematic plane views similar to FIG. 2. For example, in FIG. 4, heat generating member 4 and electrodes $\mathbf{5}_1$ and $\mathbf{5}_2$ integrally form a U-shaped wiring member. A bent portion is arranged therein and, when a plurality of wiring members are arranged, each bent portion faces in the same direction.

In the examples shown in FIGS. 2 to 8, the components similar to those in FIG. 1 are given similar reference characters.

Incidentally, the heat generating members 4 mentioned in the shown examples are constructed substantially similarly to the thermo-sensitive printing head used in the field of thermo-sensitive recording, and they are generally classified into thick film heads, thin film heads and semiconductor heads by the methods of making them and the differences between the heat generating resistors, and all of them are usable in the present invention. However, when the ink jet recording of high speed and high resolving power is to be effected, it is particularly advantageous to utilize a thin film head.

The ink IK used in the present invention may be prepared by dissolving or dispersing a wetting agent, for example, ethylene glycol, a surface active agent and various dyes into a main solvent, for example, water, ethanol, toluene or the like. In order to prevent the discharge orifice from being clogged, it is desirable to pre-filtrate insoluble particles or the like by a filter.

The invention will hereinafter be described in further detail with respect to the shown embodiment.

Figure 9A:
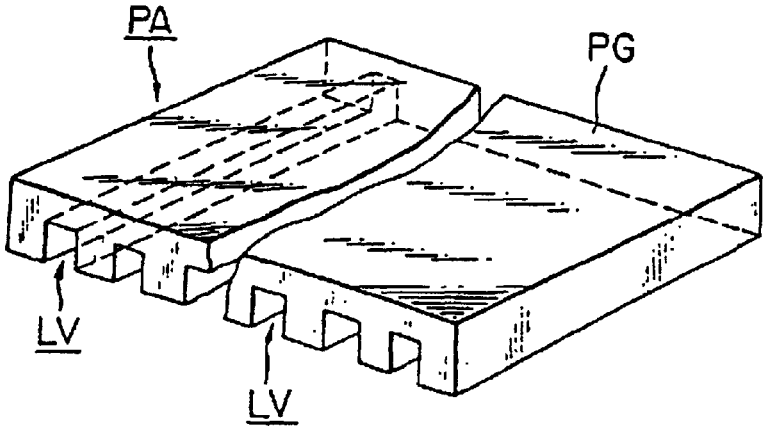
Figure 9B:
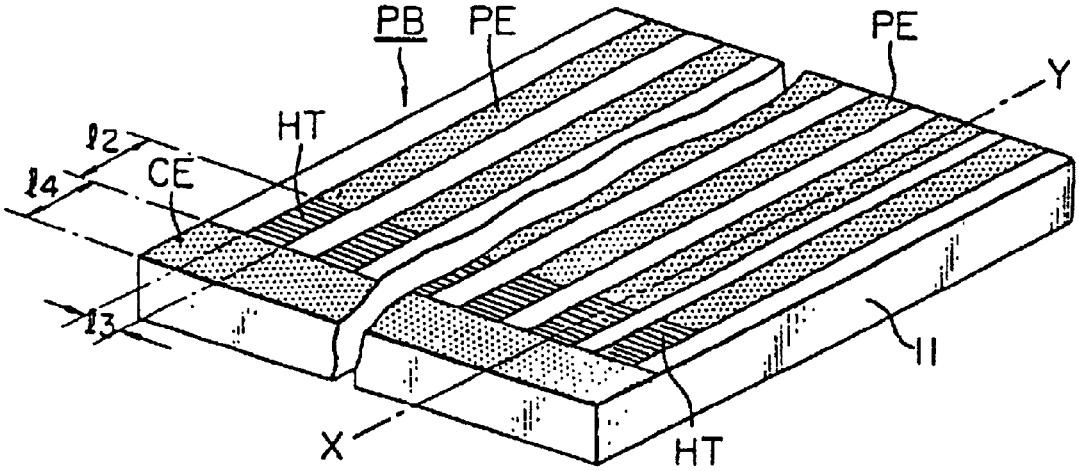

This shown embodiment will be described in accordance with the assembling process of the multi-orifice array recording head. In FIGS. 9A and 9B, two components PA and PB for forming the action chamber block of the multi-orifice array recording head are depicted in schematic perspective view. FIG. 9A shows the component PA and FIG. 9B shows the component PB. The component PA is prepared in the following procedures.

First, both surfaces of a flat plate of alkali metal fluoride photosensitive glass (a composition containing $SiO_2$, $Li_2O$, $Na_2O$, $K_2O$, $Al_2O_3$, Au, AgCl and $CeO_2$) is polished, whereafter it is cut into a size of 100 mm×100 mm (thickness 2 mm). As the photosensitive glass of this kind, Photoceram and Photoform (tradenames: produced by Corning Co., Inc.) are commercially available and any of these may be used. Next, for the thus prepared photosensitive glass plate PG, a coupling wave of 310 mm of dye laser light resulting from exciting an unshown $N_2$ laser to 620 mm has been taken out to thereby print interference stripes of pitch 100 μm and width 50 μm on the photosensitive glass plate. These interference stripes have been uniform in the surface of 90 mm×90 mm. The electric power of the laser light source has been 10 W and, since the photosensitive glass has an absorption of $Ce^{++}$ for the wavelength 310 μm, exposure has been selectively effected by a laser light of the wavelength corresponding to such absorption. After the interference stripes have been printed, the glass plate PG has been heated at about 600° C. for an hour to crystallize the same. The surface of the glass plate PG has been polished to a thickness of about 0.1 mm to further smooth such surface, whereafter the surface of the glass plate opposite to the polished surface has been coated with resin, and then the glass plate PG has been immersed in about 5% HF aqueous solution and subjected to etching while applying an ultrasonic wave thereto. Incidentally, in this etching, the etching speed of the crystallized portion of the glass plate PG has been sufficiently higher than that of the non-crystalline portion and actually, there has been a difference of the order of 20:1 in the etching rate.

By the above-described treatment, as shown in FIG. 9A, a predetermined number of long grooves LV each having a cross-section of 50 μm×50 μm have been formed at a pitch of 100 μm on the glass plate PG.

These grooves LV are not restricted to the above-described embodiment, but grooves each having a cross-section of 10 μm×10 μm–150 μm×150 μm may be freely formed in the range of pitch 30 μm–200 μm by adjusting an exposure optical system, etc.

By the above-described technique, total six treated glass plates PG have been prepared.

Figure 10:
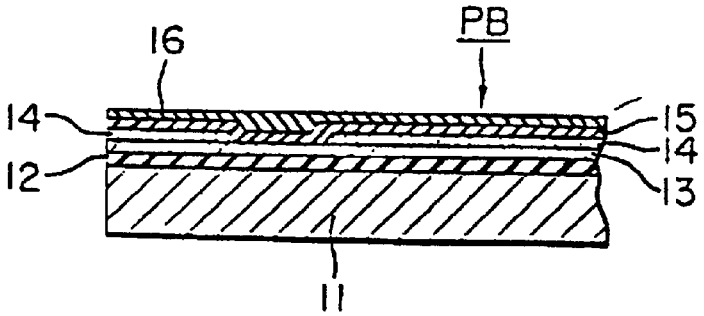

Next, epoxy resin as a cementing material is applied to the grooved surface of each glass plate PG thus formed with long grooves, by the dipping method. In this case, if the glass plate PG is lifted in a direction parallel to the axes of the grooves LV, there is obtained a coating of epoxy resin which is substantially uniform along the wall surfaces of the formed grooves LV. Thereafter, this coating has been preparatorily dried at 100° C. for about five minutes and half-cured, whereafter the glass plate has been cut into a predetermined size to obtain a component PA. The cementing material is not limited to the epoxy resin. The cementing material used herein is a material which creates cementing action by heating, and may be, for example, an organic compound adhesive agent such as epoxy resin adhesive, phenolic resin adhesive, urethane resin adhesive, silicone resin adhesive, triazine resin, BT resin or the like, or inorganic compounds such as melted silver salts, low melting point glasses or the like mentioned in Japanese Patent Publication No. 20227/1963. Above all, in the case of the latter inorganic compounds, they are often used not in liquidous phase but in powder form. Separately from the component PA, the component PB as shown in FIG. 9B is also prepared. This component PB can be obtained by successively laminating a heat accumulating layer ($SiO_2$ sputter film of 2–3 μm) 12, a heat generating resistor layer ($HfB_2$ sputter film of 500–1000 Å) 13, an electrode layer (evaporated aluminum layer of 700–800 Å) 14, a protective layer ($SiO_2$ sputter film of 1 μm) 15 and a stopping layer (Parylene, silicone or $Ta_2O_3$ sputter film) 16 on a substrate (thickness about 0.6 mm) formed of alumina, single crystal silicon or a metal such as aluminum, iron or the like, as shown in FIG. 10 which is a cross-sectional view taken along line X-Y of FIG. 9B, and thereafter cutting the same into a predetermined size. In this case, the electrode layer 14 is etched into a predetermined pattern and separated into individual lead electrodes PE and a common lead electrode CE, as shown in the perspective view of FIG. 9B. At the same time, the heat generating resistor layer 13 has been exposed in a rectangular pattern HT at the same pitch as the long grooves LV in the component PA so that the length of $l_2$ is 250 μm and the length of $l_3$ is 50 μm. The protective layer 15 and the stopping layer 16 shown in FIG. 10 may not be laminated in some cases.

A total of six substrates 11 each formed with a predetermined number of heat generating resistor patterns HT as described above have been prepared. These substrates 11 have been cut along a line parallel to a line along which the number of heat generating resistor patterns HT are arranged, so that the width $l_4$ of the common lead electrode CE is 80 μm (component B-1), 150 μm (component B-2), 350 μm (component B-3), 800 μm (component B-4), 1500 μm (component B-5) and 2500 μm (component B-6), respectively. The location of the cut determines a relative location between the heat generating resistor patterns HT and the discharge orifices 6.

Figure 11:
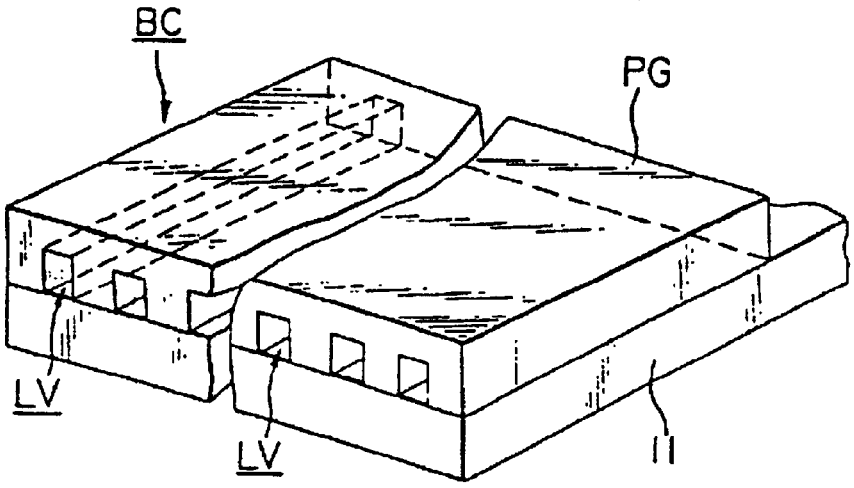

The thus prepared six components PA and PB are located with respect to each other so that the grooves LV correspond in position to the heat generating resistor patterns HT as shown in FIG. 11, thereafter they are adhesively secured to each other. Next, these are heated at about 100° C. for ten minutes to half-cure an unshown adhesive layer and at this point of time, the presence or absence of any positional deviation therebetween or clogging of the grooves LV is checked up. When the result of this check-up is "no", the components PA and PB are separated from each other, whereafter the component PB is cleaned for re-utilization. The component PA is abandoned. When there is found no defect, the component PB is heated at 100° C. for fifty minutes and at 180° C. for two hours to completely cure the adhesive layer. Thereafter, the presence or absence of clogging of the grooves LV is again checked up and, when there is found no defect, the assembled action block BC is transferred to the next step of process.

Figure 12:
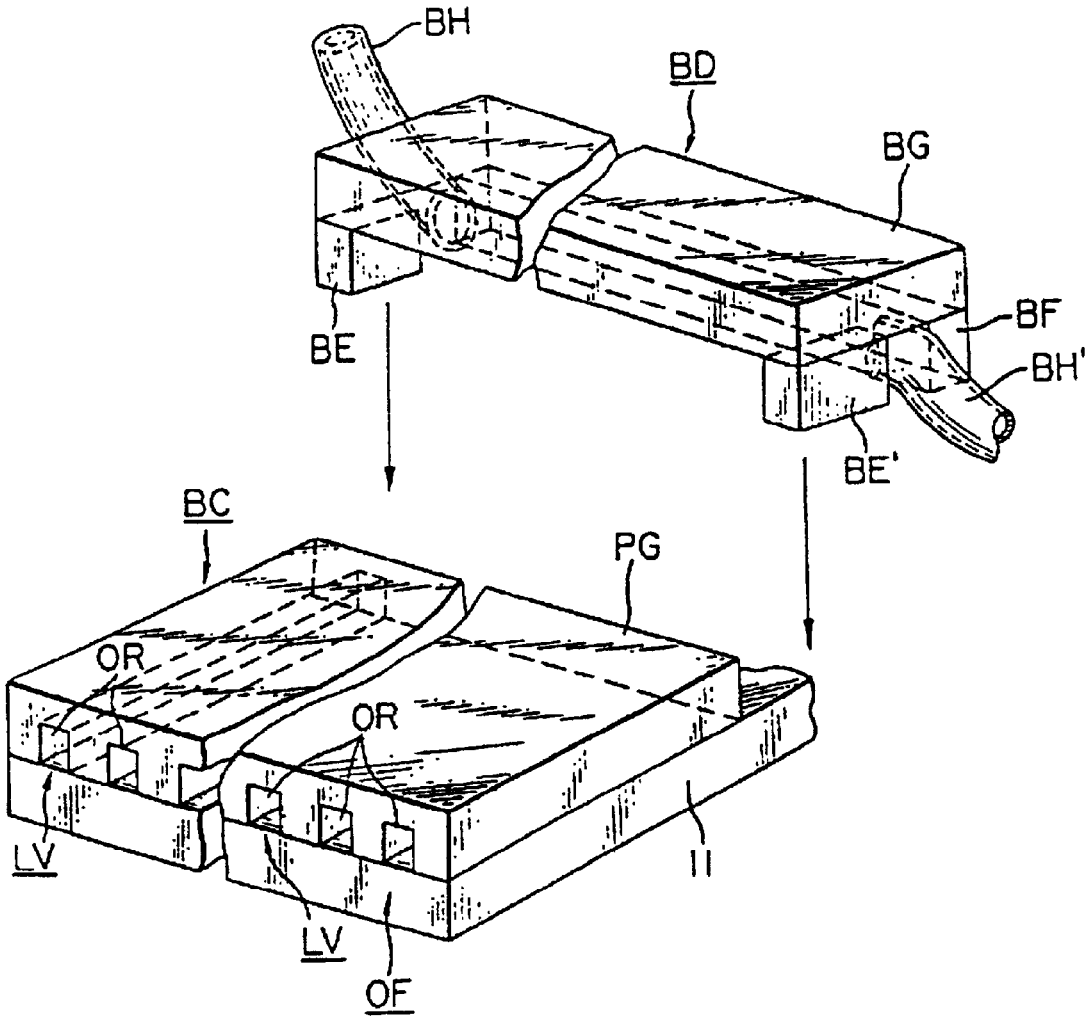

In the ensuing step, assembly of a relay chamber block BD concerned with ink supply as shown in FIG. 12 is carried out. First, a cementing material of the following composition is applied to side plate components BE and BE', and then the relay chamber block BD is located with respect to the action block BC as indicated by arrows in FIG. 12, whereafter they are heated at about 60° C. for one minute to half-cure the cementing material, and then the presence or absence of any positional deviation therebetween or inflow of the cementing material into the other component is checked up.

Cementing material:

Epikoat 828 (produced by Shell Chemical Co.) 100 parts by weight

Epomate B-002 (produced by Aginomoto Co.) 40 parts by weight

When the result of this check-up is "no", the components BE and BE' are separated from the block BC, Thereafter the two are cleaned for re-utilization. When there is no defect, they are heated at about 60° C. for thirty minutes to cure the cementing material.

Next, a cementing material is applied to a rear end component BF and the location thereof is effected, whereafter it is heated at about 60° C. for one minute to half-cure the cementing material, and then a check-up similar to that in the previous step is effected and, when the result of the check-up is "no", the component BF is cleaned and, when there is no defect, it is heated at about 60° C. for thirty minutes to cure the cementing material.

Subsequently, a cementing material is applied to a top plate component BG and the location thereof is effected, thereafter the top plate component is heated at about 60° C. for one minute to half-cure the cementing material, and then a check-up similar to that in the previous step is carried out and, when the result of this check-up is "no", the top plate component is cleaned in the same manner as in the previous step and, when there is no defect, it is heated at about 60° C. for thirty minutes and further at about 100° C. for ten minutes to completely cure the cementing material.

Subsequently, tubular components BH and BH' are inserted into predetermined positions in the block which has assembled by said step, and the clearances are filled with a cementing material. In this case, it is necessary to cure the cementing material slowly and therefore, the assembly is left at room temperature for thirty minutes. Next, the presence or absence of inflow of the cementing material into the components BH and BH' or inflow of the cementing material into the ink supply relay chamber is checked up. When the result of this check-up is "no", the assembly is cleaned for re-utilization in the same manner as in the previous step. When there is no defect, it is heated at about 60° C. for thirty minutes and further at 100° C. for ten minutes to completely cure the cementing material.

In this manner, the connection of the relay chamber block BD to the rear of the action block BC is completed. Thereafter, the end face OF of the action block BC whereat discharge orifices OR are installed is polished by the use of polishing sand (#1000 or more) so as to form a smooth surface. Subsequently, cleaning is effected to remove any polishing sand and unnecessary materials which have entered into the grooves LV through the orifices OR during the polishing. Whether or not the end face OF has become a completely flat surface and whether or not the interior of the grooves LV has been completely cleaned is checked up and, when the polishing is incomplete, the end face OF is re-polished and subsequently cleaning is effected. A similar check-up is effected and, when the result of the check-up is "No", this step is repeated and, when there is no defect, the assembly of the block BC and the block BD is dried.

Further, the completed head is joined to an aluminum plate and the lead electrodes are connected to a flexible wiring plate.

A specific example of the ink jet recording effected by the use of the thus obtained recording head will now be described by reference to FIG. 12. In FIG. 12, for convenience of illustration, the various component blocks are shown as being separated from one another. Actually, however, the various components and blocks are of course made integral with one another by cementing, as described above. In this shown example, recording ink is first introduced into each long grooves LV through the components BH and BH'. Next, when an electrical pulse signal is applied to the heat generating resistor, not shown, there is generated a thermal pulse and as a result, the ink is momentarily gasified. By the bubble created by this gasification, a pressure wave (action force) is applied to the ink, as a result of which the ink discharges and flies in the form of substantially uniform droplets through the orifices OR communicated with the grooves LV and these droplets adhere to the recording member, not shown, thereby accomplishing the recording.

When an experiment of ink discharge by the six recording heads completed as described above has been actually carried out by the use of ink of the following composition under the experimental conditions as mentioned below, stable discharge of ink droplets has taken place over 109 times or more in any of these recording heads and the dots obtained have been substantially uniform. The discharge speeds of the ink droplets have been as shown in the table below.

| | |
|---|---|
| Water | 70 parts by weight |
| Diethyleneglycol | 29 parts by weight |
| Black dye | 1 part by weight |

| Recording head | | Applied pulse condition | | | Ink droplet |
|---|---|---|---|---|---|
| No. | D($l_4$is component PB) | Voltage | Pulse width | Frequency | discharge speed (unit: m/sec.) |
| 1 | 80 μm | 40 V | 10 μsec. | 10 KHz | 1.3 |
| 2 | 150 μm | | | | 1.5 |
| 3 | 350 μm | | | | 2.0 |
| 4 | 800 μm | | | | 3.2 |
| 5 | 1500 μm | | | | 3.6 |
| 6 | 2500 μm | | | | 1.9 |

As has been described above in detail, according to the droplet forming apparatus shown in the embodiment, there can be provided an ink jet recording apparatus in which the responsiveness of ink droplet discharge to the information signal input and the discharge state of ink droplets are very good and the output level is high so that record images of good quality can be provided at high speed.

Although not shown, the droplet forming apparatus of the present invention described above in detail may of course be modified into a multi-orifice array type to sufficiently achieve the aforementioned objects. In this case, the liquid supply to each action chamber may be effected through a common liquid supply chamber communicated with the liquid introduction port of each of a plurality of action chambers.

What we claim is:

1. A process for producing a substrate for an ink jet recording head comprising a plurality of discharge openings for discharging a liquid and a plurality of liquid passageways each communicating with one of the plurality of discharge openings, the process comprising the steps of:

forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped wiring member with a bent portion arranged with all of said bent portions facing in the same direction; and cutting the base plate along a line substantially parallel to said line along which the plurality of heat generating resistance members are arranged at a location remote by a predetermined distance from each of the plurality of heat generating resistance members to form the substrate, the location for cutting determining a relative location between the plurality of heat generating resistance members and the plurality of discharge openings of the ink jet recording head to be produced using the substrate.

2. A process for producing an ink jet recording head comprising a plurality of discharge openings for discharging a liquid and a plurality of liquid passageways each communicating with one of the plurality of discharge openings, the process comprising the steps of:

forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped wiring member with a bent portion arranged with all of said bent portions facing in the same direction;

cutting the base plate along a line substantially parallel to said line along which the plurality of heat generating resistance members are arranged at a location remote by a predetermined distance from each of the plurality of heat generating resistance members to form a substrate for the ink jet recording head, the location for cutting determining a relative location between the plurality of heat generating resistance members and the plurality of discharge openings of the ink jet recording head to be produced using the substrate; and attaching a liquid passageway forming member onto the substrate, whereby a plurality of liquid passageways are formed each corresponding to one of the U-shaped wiring members.

3. The process according to claim 2, wherein the end portions of the plurality of liquid passageways are formed corresponding to the end portion of the base plate.

4. An ink jet recording head comprising a plurality of discharge openings for discharging a liquid and a plurality of liquid passageways each communicating with one of the plurality of discharge openings, the ink jet recording head being produced by a production process comprising the steps of:

forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped wiring member with a bent portion arranged with all of said bent portions facing in the same direction;

cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and attaching a liquid passageway forming member onto the substrate, whereby a plurality of liquid passageways are formed each corresponding to one of the U-shaped wiring members, wherein the end portions of the plurality of liquid passageways are formed corresponding to the cut end portion of the substrate.

5. An ink jet recording apparatus comprising an ink jet recording head comprising a plurality of discharge openings for discharging a liquid and a plurality of liquid passageways each communicating with one of the plurality of discharge openings, and means for supplying electric power to the ink jet recording head, the ink jet recording head being produced by a production process comprising the steps of:

forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped wiring member with a bent portion arranged with all of said bent portions facing in the same direction;

cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and attaching a liquid passageway forming member onto the substrate, whereby a plurality of liquid passageways are formed each corresponding to one of the U-shaped wiring members, wherein the end portions of the plurality of liquid passageways are formed corresponding to the cut end portion of the substrate.

*6. A process according to claim 1, wherein each heat generating resistance member is a planar member having a longer side extending along the liquid passageway and a shorter side orthogonal to the liquid passageway, with the longer side having a length at least two times as long as the length of the shorter side.*

*7. A process according to claim 1, wherein each said pair of electrodes and each corresponding heat generating resistance member are laminated in layers.*

*8. A process according to claim 2, wherein each heat generating resistance member is a planar member having a longer side extending along the liquid passageway and a shorter side orthogonal to the liquid passageway, with the longer side having a length at least two times as long as the length of said shorter side.*

*9. A process according to claim 2, wherein each said pair of electrodes and each corresponding heat generating resistance member are laminated in layers.*

*10. An ink jet recording head according to claim 4, wherein each heat generating resistance member is a planar member having a longer side extending along the liquid passageway and a shorter side orthogonal to the liquid passageway, with the longer side having a length at least two times as long as the length of the shorter side.*

*11. An ink jet recording head according to claim 4, wherein each said pair of electrodes and each corresponding heat generating resistance member are laminated in layers.*

*12. An ink jet recording apparatus according to claim 5, wherein each heat generating resistance member is a planar member having a longer side extending along the liquid passageway and a shorter side orthogonal to the liquid passageway, with the longer side having a length at least two times as long as the length of the shorter side.*

*13. An ink jet recording apparatus according to claim 5, wherein each said pair of electrodes and each corresponding heat generating resistance member are laminated in layers.*

*14. A process for producing a substrate for an ink jet recording head comprising a plurality of discharge openings for discharging a liquid and a plurality of liquid passageways, each communicating with one of the plurality of discharge openings, the process comprising the steps of:*

*forming in a predetermined pattern on a base plate a plurality of heat generating resistance members arranged generally along a line and a plurality of electrodes, including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each heat generating resistance member being a planar member having a longer side extending along the liquid passageway and a shorter side*

*orthogonal to the liquid passageway, with the longer side having a length at least two times as long as the length of the shorter side; and*

*cutting the base plate along a line substantially parallel to the line along which the plurality of heat generating resistance members are arranged at a location remote by a predetermined distance from each of the plurality of heat generating resistance members to form the substrate, the location for cutting determining a relative location between the plurality of heat generating resistance members and the plurality of discharge openings of the ink jet recording head to be produced using the substrate.*

*15. A process for producing an ink jet recording head comprising a plurality of discharge openings for discharging a liquid and a plurality of liquid passageways each communicating with one of the plurality of discharge openings, the process comprising the steps of:*

*forming in a predetermined pattern on a base plate a plurality of heat generating resistance members arranged generally along a line and a plurality of electrodes including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each heat generating resistance member being a planar member having a longer side extending along the liquid passageway and a shorter side orthogonal to the liquid passageway, with the longer side having a length at least two times as long as the length of the shorter side;*

*cutting the base plate along a line substantially parallel to said line along which the plurality of heat generating resistance members are arranged at a location remote by a predetermined distance from each of the plurality of heat generating resistance members to form a substrate for the ink jet recording head, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths.*

*16. An ink jet recording head comprising a plurality of discharge openings for discharging a liquid and a plurality of liquid passageways each communicating with one of the plurality of discharge openings, the ink jet recording head being produced by a production process comprising the steps of:*

*forming in a predetermined pattern on a base plate a plurality of heat generating resistance members arranged generally along a line and a plurality of electrodes including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each heat generating resistance member being a planar member having a longer side extending along the liquid passageway and a shorter side orthogonal to the liquid passageway, with the longer side having a length at least two times as long as the length of the shorter side;*

*cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed each corresponding to one of the U-shaped conductive portions,*

*wherein the end portions of the plurality of liquid passageways are formed corresponding to the cut end portion of the substrate.*

*17. An ink jet recording apparatus comprising an ink jet recording head comprising a plurality of discharge openings for discharging a liquid and a plurality of liquid passageways each communicating with one of the plurality of discharge openings, and a controller for supplying electric power to the ink jet recording head, the ink jet recording head being produced by a production process comprising the steps of:*

*forming in a predetermined pattern on a base plate a plurality of heat generating resistance members arranged generally along a line and a plurality of electrodes including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each heat generating resistance member being a planar member having a longer side extending along the liquid passageway and a shorter side orthogonal to the liquid passageway, with the longer side having a length at least two times as long as the length of the shorter side;*

*cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths,*

*wherein the end portions of the plurality of liquid passageways are formed corresponding to the cut end portion of the substrate.*

*18. A process for producing a substrate for an ink jet recording head comprising a plurality of discharge openings*

*for discharging a liquid and a plurality of liquid passageways, each communicating with one of the plurality of discharge openings, the process comprising the steps of:*

*forming in a predetermined pattern on a base plate a plurality of heat generating resistance members arranged generally along a line and a plurality of electrodes, including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each selective electrode, ground electrode and corresponding heat generating resistance member are laminated in at least two layers; and*

*cutting the base plate along a line substantially parallel to the line along which the plurality of heat generating resistance members are arranged at a location remote by a predetermined distance from each of the plurality of heat generating resistance members to form the substrate, the location for cutting determining a relative location between the plurality of heat generating resistance members and the plurality of discharge openings of the ink jet recording head to be produced using the substrate.*

*19. A process for producing an ink jet recording head comprising a plurality of discharge openings for discharging a liquid and a plurality of liquid passageways each communicating with one of the plurality of discharge openings, the process comprising the steps of:*

*forming in a predetermined pattern on a base plate a plurality of heat generating resistance members arranged generally along a line and a plurality of electrodes including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each selective electrode, ground electrode and corresponding heat generating resistance member are laminated in at least two layers;*

*cutting the base plate along a line substantially parallel to said line along which the plurality of heat generating resistance members are arranged at a location remote by a predetermined distance from each of the plurality of heat generating resistance members to form a substrate for the ink jet recording head, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths.*

*20. An ink jet recording head comprising a plurality of discharge openings for discharging a liquid and a plurality of liquid passageways each communicating with one of the plurality of discharge openings, the ink jet recording head being produced by a production process comprising the steps of:*

*forming in a predetermined pattern on a base plate a plurality of heat generating resistance members arranged generally along a line and a plurality of electrodes including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each selective electrode, ground electrode and corresponding heat generating resistance member are laminated in at least two layers;*

*cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive portions,*

*wherein the end portions of the plurality of liquid passageways are formed corresponding to the cut end portion of the substrate.*

*21. An ink jet recording apparatus comprising an ink jet recording head comprising a plurality of discharge openings for discharging a liquid and a plurality of liquid passageways each communicating with one of the plurality of discharge openings, and a controller for supplying electric power to the ink jet recording head, the ink jet recording head being produced by a production process comprising the steps of:*

*forming in a predetermined pattern on a base plate a plurality of heat generating resistance members arranged generally along a line and a plurality of electrodes including at least one selective electrode and at least one ground electrode, with each of the plurality of heat generating resistance members being connected to a selective electrode and a ground electrode, wherein each heat generating resistance member and corresponding selective and ground electrodes integrally form a U-shaped conductive path with each U-shaped conductive path facing in the same direction, and each selective electrode, ground electrode and corresponding heat generating resistance member are laminated in at least two layers;*

*cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths,*

*wherein the end portions of the plurality of liquid passageways are formed corresponding to the cut end portion of the substrate.*

*22. A process for producing a substrate for an ink jet recording head comprising a plurality of discharge openings for discharging a liquid and a plurality of liquid passageways each communicating with one of the plurality of discharge openings, the process comprising the steps of:*

*forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped conductive path with a bent portion arranged with all of said bent portions facing in the same direction, wherein each said pair of electrodes and each corresponding heat generating resistance member are laminated in layers; and*

*cutting the base plate along a line substantially parallel to said line along which the plurality of heat generating resistance members are arranged at a location remote by a predetermined distance from each of the plurality of heat generating resistance members to form the substrate, the location for cutting determining a relative location between the plurality of heat generating resistance members and the plurality of discharge openings of the ink jet recording head to be produced using the substrate.*

*23. A process for producing an ink jet recording head comprising a plurality of discharge openings for discharging a liquid and a plurality of liquid passageways each communicating with one of the plurality of discharge openings, the process comprising the steps of:*

*forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped conductive path with a bent portion arranged with all of said bent portions facing in the same direction, wherein each said pair of electrodes and each corresponding heat generating resistance member are laminated in layers;*

*cutting the base plate along a line substantially parallel to said line along which the plurality of heat generating resistance members are arranged at a location remote by a predetermined distance from each of the plurality of heat generating resistance members to form a substrate for the ink jet recording head, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths.*

*24. An ink jet recording head comprising a plurality of discharge openings for discharging a liquid and a plurality of liquid passageways each communicating with one of the plurality of discharge openings, the ink jet recording head being produced by a production process comprising the steps of:*

*forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped conductive path with a bent portion arranged with all of said bent portions facing in the same direction, wherein each said pair of electrodes and each corresponding heat generating resistance member are laminated in layers;*

*cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths,*

*wherein the end portions of the plurality of liquid passageways are formed corresponding to the cut end portion of the substrate.*

*25. An ink jet recording apparatus comprising an ink jet recording head comprising a plurality of discharge openings for discharging a liquid and a plurality of liquid passageways each communicating with one of the plurality of discharge openings, and a controller for supplying electric power to the ink jet recording head, the ink jet recording head being produced by a production process comprising the steps of:*

*forming in a predetermined pattern on a base plate a plurality of heat generating resistance members arranged generally along a line and a plurality of pairs of electrodes each connected to one of the plurality of heat generating resistance members, wherein each said pair of electrodes and each corresponding heat generating resistance member integrally form a U-shaped conductive path with a bent portion arranged with all of said bent portions facing in the same direction, wherein each said pair of electrodes and each corresponding heat generating resistance member are laminated in layers;*

*cutting the base plate along a line substantially parallel to said line along which the plurality of heat generating resistance members are arranged at a location remote by a predetermined distance from each of the plurality of heat generating resistance members to form a substrate for the ink jet recording head having a cut end portion, the location for cutting determining a relative location between the plurality of heat generating resistance members and the plurality of discharge openings of the ink jet recording head to be produced using the substrate; and*

*attaching a liquid passageway forming member onto the substrate, whereby a plurality of liquid passageways are formed corresponding to the U-shaped conductive paths,*

*wherein the end portions of the plurality of liquid passageways are formed corresponding to the cut end portion of the substrate.*

* * * * *

UNITED STATES PATENT AND TRADEMARK OFFICE

CERTIFICATE OF CORRECTION

PATENT NO. : RE 40,529 E
APPLICATION NO. : 09/921333
DATED : October 7, 2008
INVENTOR(S) : Shirato et al.

It is certified that error appears in the above-identified patent and that said Letters Patent is hereby corrected as shown below:

COLUMN 2
Line 31, “break up” should read --breakup--.

COLUMN 7
Line 16, “total” should read --a total of--.

COLUMN 8
Line 9, “FIG. 11,” should read --FIG. 11;--.
Line 64, “has” should read --has been--.

COLUMN 9
Line 37, “each” should read --each of the--.

Signed and Sealed this

Twenty-fourth Day of March, 2009

John Doll

JOHN DOLL
*Acting Director of the United States Patent and Trademark Office*